United States Patent [19]

Darden

[11] Patent Number: 5,375,400

[45] Date of Patent: Dec. 27, 1994

[54] PERIPHERAL MOWER BLADE

[76] Inventor: John A. Darden, Rte. #1 Box 85, Lenox, Ga. 31637

[21] Appl. No.: 138,232

[22] Filed: Oct. 14, 1993

[51] Int. Cl.⁵ .......................................... A01D 34/03
[52] U.S. Cl. ...................................... 56/17.5; 56/255; 56/295
[58] Field of Search ................. 56/13.4, 17.5, 255, 56/295, DIG. 17, DIG. 20

[56] References Cited

U.S. PATENT DOCUMENTS 5,142,851  9/1992  Lydy et al. ..................... 56/13.4
5,209,052  5/1993  Carroll .......................... 56/255
5,293,735  3/1994  Nascone ......................... 56/255

Primary Examiner—Ramon S. Britts
Assistant Examiner—Pamela A. O'Connor

[57] ABSTRACT

The peripheral mower blade is designed to cut and mulch grass at high volume. The blade is so designed to reduce back drag and require less horsepower. Peripheral blades will not throw objects out from under the mower deck they are mounted on, nor will they come apart creating a dangerous environment for those who are around the mower. The construction of the blade being one piece makes manufacture of it less expense and replacement of the blades less often.

2 Claims, 3 Drawing Sheets

PERIPHERAL MOWER BLADE

BRIEF DESCRIPTION OF THE DRAWINGS

The invention and its advantages will be more fully described by way of example in the following description of the invention as illustrated in the accompanying drawings in which.

DETAILED DESCRIPTION

Figure 1:
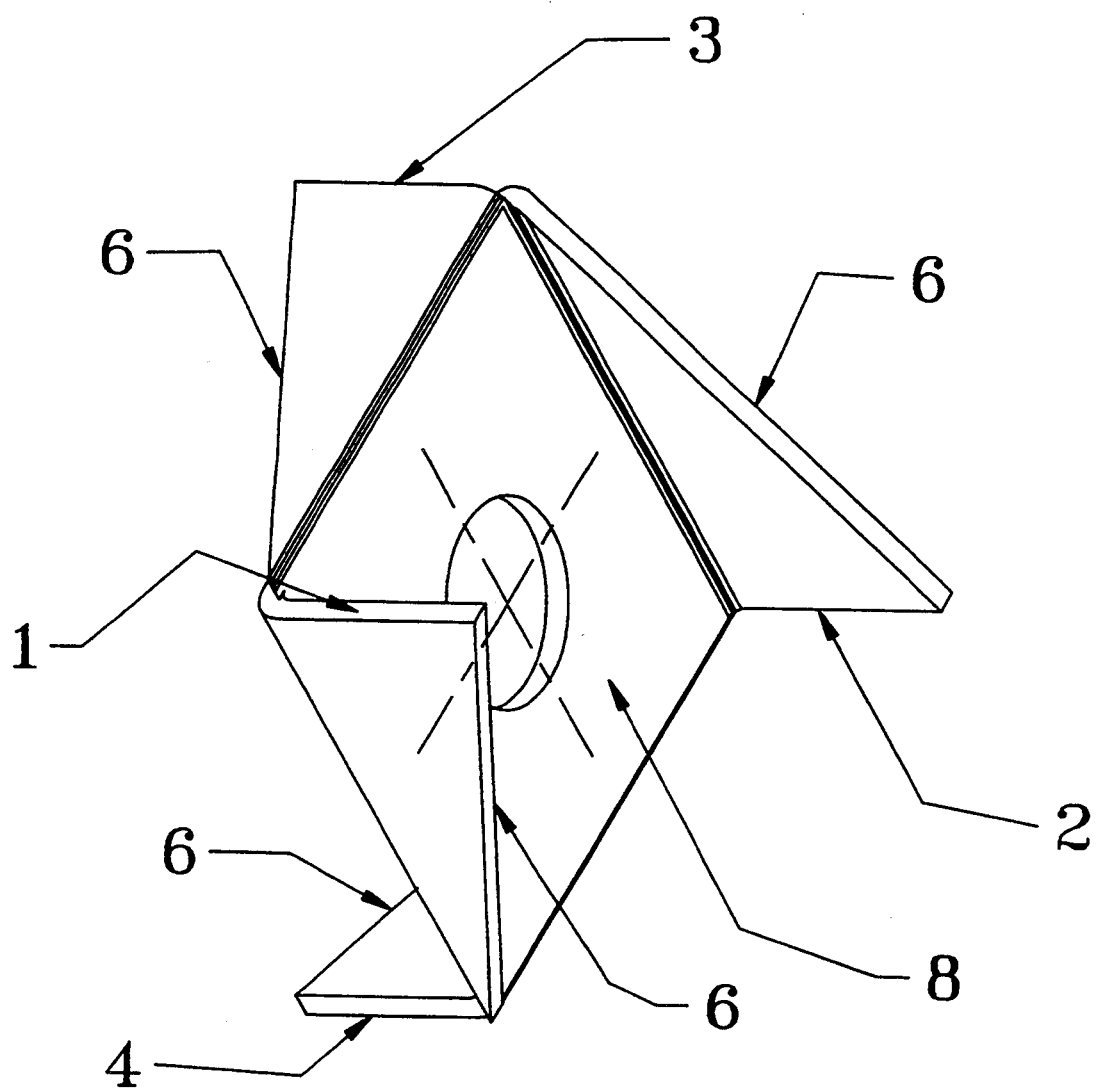
FIG. 1 is a perspective view of the rotary cutting and mulching blade of the present invention.
Figure 2:
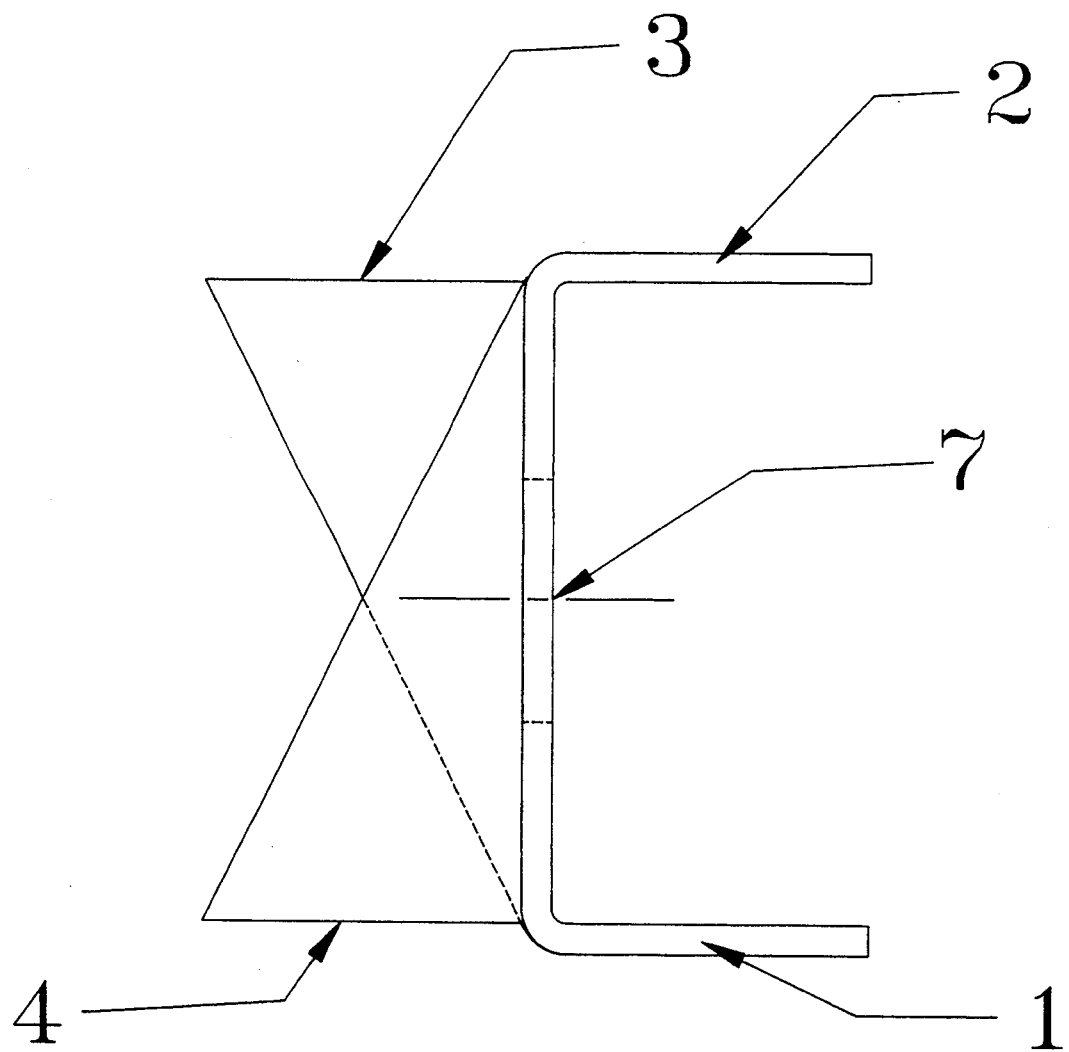
FIG. 2 is a side view of the blade of FIG. 1.

The blade described in the following statement has a square mounting surface with an aperture there though which a shaft can pass for mounting. The square mounting surface (ref #8 FIG. 1) has four extended sides, bent 90 degrees to the square mounting surface. Two are bent to the left and two to the right. The sides and that portion that is bent is parallel to the shaft that will pass though the mounting hole. This leaves a square that is measured diagonally for blade size which depends on the size of the blade desired. The cutting edges (ref #1, 2, 3, 4 FIG. 1) are along the front edge of the extended sides. The length of the cutting edge also depend on the desired size of the blade. The trailing edge of the blade is angled back (ref #6 FIG. 1) to the square section of the blade for strength, the cutting edge is not necessarily sharpened, but is hardened for wear. To determine the blade size the use is a must to know. The smaller blade is used for carpet grasses. The larger blade is used for heavier grasses often in highway right-of-ways. The blade thickness can vary in accordance to blade size and use.

To make the blade described in the above paragraph. Start with a flat steel plate of appropriate size and thickness to complete the blade. Mark off a square of the desired size, then at the upper left corner draw a line that is a continuation of the top line of the square to the left of the square and is also perpendicular to the left side of the square, this will be the cutting edge. Once the cutting edge length is determined angle the line back to the lower left corner of the square. Rotate the square 90 degrees and do the same again, until all four corners have a cutting edge on them. At this point the hole is drilled in the exact center of the square, determined by the intersection of two diagonal lines from each corner of the square. The next step is to cut out the blade. Once this is done bend the cutting edges. The cutting edge being that portion of the blade extending beyond the square, make the bend on the line that forms that side of the square. Bend one side so it is 90 degrees, then bend the side that is opposite of the first that was bent, the same direction as the first bend. Next bend the two remaining sides 90 degrees but in the opposite direction.

Figure 3:
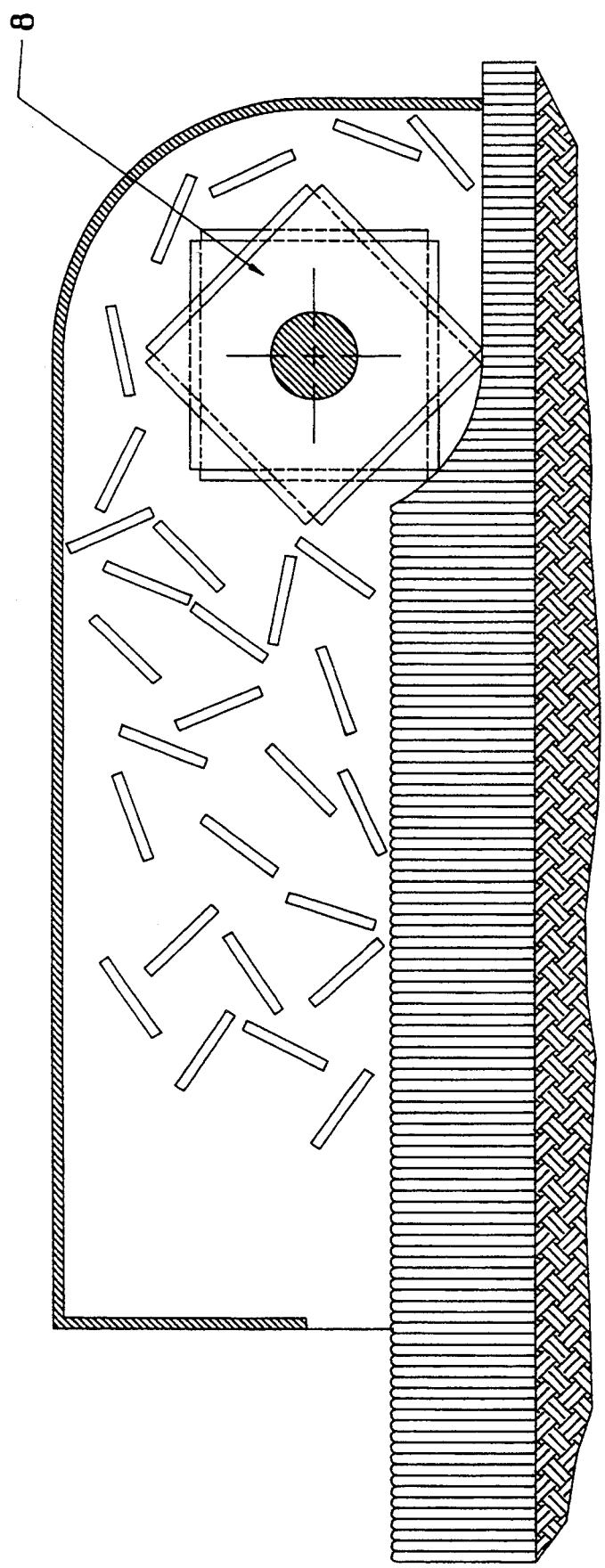

The blade is to be mounted on a shaft with a number of other blades of the same type (FIG. 3). Each blade is separated by bushing that allows only ½ inch of blade overlap. The blades and bushing are now clamped tight enough to prevent slippage unless one of the blades strike as object, this allows for safety. The shaft is to be rotated at high speed. The blade rotates and cuts toward the direction of travel. The smaller blade is used mainly for carpet grasses, the larger blade is used for higher grasses like bahia grasses, and small weeds. This blade is not intended for large weeds, with stalk diameter of over ¼".

The main intent of this blade is for safety, less horsepower requirement, and lower maintenance cost. Safety comes in when the blade strikes a loose object, because of the peripheral path of the blade it cuts at it's dwell to the relative surface, so it can not throw the object more than 5 or 6 feet, unlike conventional mower blades that often throw objects 30 to 50 feet. This would be exceptionally useful on highway right of ways where mowers often throw grass, bottles, cans and other debrie on the road creating a hazard to motorist. The blade is of a one piece construction so there is not a chance of the blade flying apart, which is hazardous to bystanders, like the flail mower blades. The speed of the blade, and the design that the blade rotates on a peripheral path perpendicular to the cut, eliminates back drag, so the torque backup is not required by the engine. Larger cutting widths can be mounted on lower horsepower units, there by creating a fuel saving. Lower maintenance cost is achieved by the fact that the blade is one piece, there is no moving parts to wear like the flail mower blade, so replacement is less often. The high speed allows the blades too cut without having to sharpen it saving down time. Due to the design of the blade when it cuts the grass the clippings are sent to the center of the blade, then centrifugal force throws the clippings out into the blade path again, then the blade cuts the clippings again several times causing it to mulch the clippings before it discharges them out the back of the deck.

I claim:

1. A rotary cutting and mulching blade comprising:
    a substantially square mounting section, having an upper and lower surface, said mounting section including a central aperture for mounting said blade to a horizontal rotary shaft, and;
    a plurality of extended cutting blades projecting perpendicular to the mounting section, said blades including two of which extend from the upper surface on opposing blades of said mounting section and two of which extend from the lower surface on opposing blades of said mounting section, and;
    each cutting blade having the general shape of a right triangle with each cutting blade of each surface being oppositely oriented, wherein the cutting blade includes a diagonal surface.

2. The rotary cutting and mulching blade of claim 1 wherein said blade is a one-piece blade.

* * * * *